T. LIBBEY.
Horse-Rake.

No. 217,951.  Patented July 29, 1879.

Witnesses
S. N. Piper
M. H. Lunt

Inventor
Tristram Libbey
by attorney
R. H. Eddy

UNITED STATES PATENT OFFICE.

TRISTRAM LIBBEY, OF CANTON, MAINE.

IMPROVEMENT IN HORSE-RAKES.

Specification forming part of Letters Patent No. 217,951, dated July 29, 1879; application filed April 9, 1879.

*To all whom it may concern:*

Be it known that I, TRISTRAM LIBBEY, of Canton, of the county of Oxford and State of Maine, have invented a new and useful Improvement in Horse-Rakes; and do hereby declare the same to be described in the following specification and represented in the accompanying drawings, of which—

Figure 1:
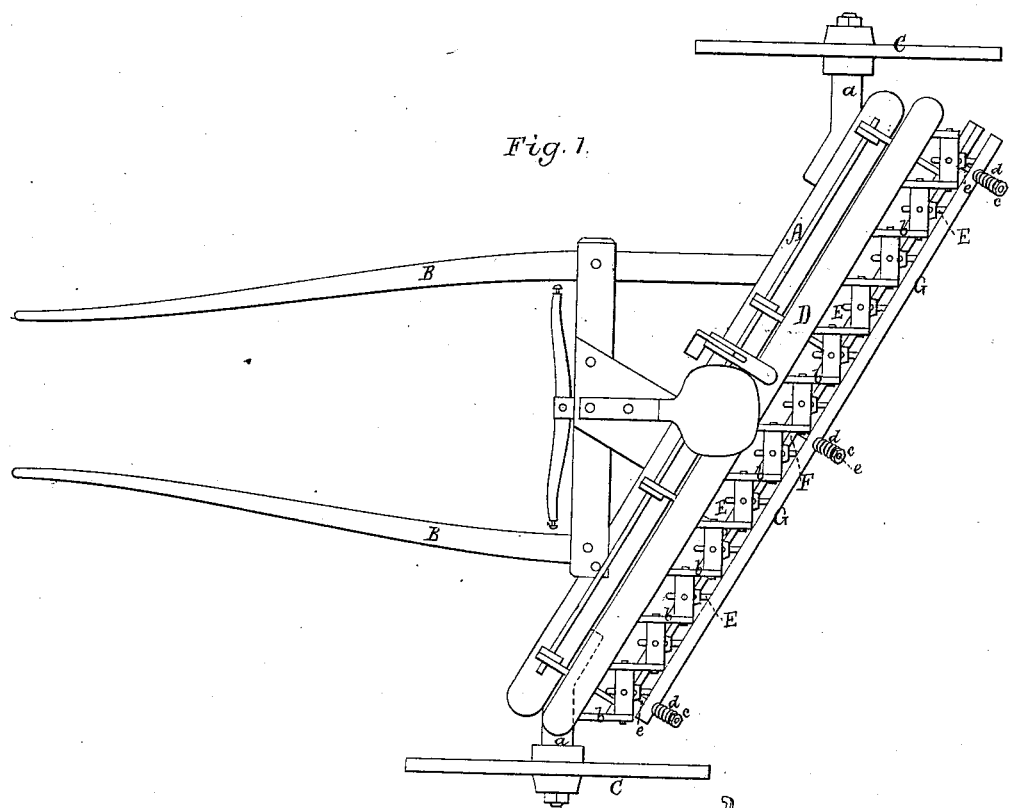
Figure 2:
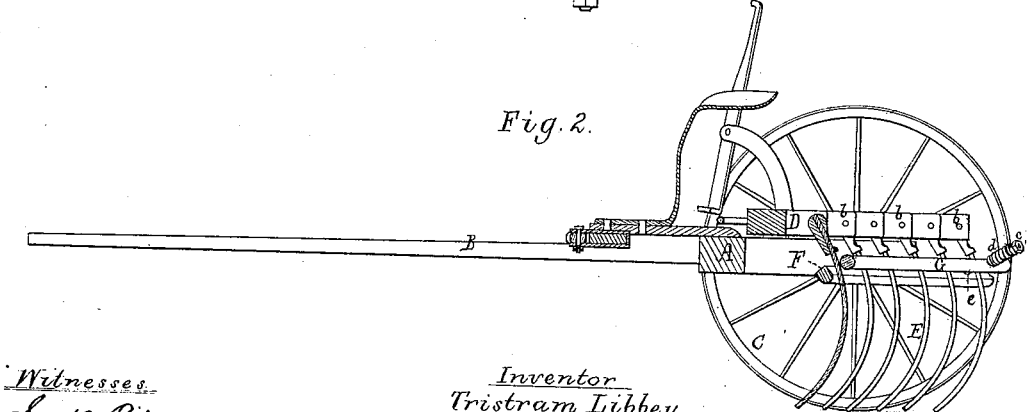

Figure 1 is a top view, and Fig. 2 a longitudinal section, of a horse-rake embracing my invention.

In this rake the series or set of teeth—or "fingers," as they are usually termed—is disposed obliquely to the line of draft or medial line between the two thills, whereby hay while being raked by the machine is caused to be moved laterally on the teeth and deposited in a windrow. Furthermore, each of the teeth or fingers is adapted to swing in, or about in, a vertical plane parallel to the line or direction of draft. The axle is also oblique to the medial line of the shafts, and has the wheel-journals applied to it so as to stand at right angles with such line, in order for the wheels to revolve in planes parallel with such line.

In the drawings, A denotes the axle, and B B the thills, such axle being disposed obliquely to the thills, and having journals $a$ $a$ of the wheels C C arranged to project from it at right angles to the medial line between the thills. In the place of thills a draft-pole may be used, in which case the set of rake-teeth and their supporting-head, or such and the axle, are to be disposed obliquely to the line of draft, which would be the axis of the pole.

Disposed in rear of and parallel to the axle, and hinged to it, is the rake-head D, having each of the fingers or teeth E of the set of rake-teeth pivoted to it, (or to projections $b$ $b$ extending from it,) so as to swing or turn in a vertical plane parallel to the pole or to the said medial line of the thills or shafts. These teeth go down between two support-bars, F G, arranged as shown, one of them—viz., that marked F—being stationary relatively to the rake-head. The other bar, G, slides on short rods $e$, projecting from the bar F, and having heads or nuts $c$ and springs $d$ on each, as shown, such being to enable the bar to yield against the pressure of the rake-teeth when the rake is in use.

From the above it will be seen that the series of teeth while being drawn against the mown hay in a field will not only gather it up, but move it laterally, so as to deposit it in a windrow, thereby saving much of the labor of hand-raking usually required with hay raked by a horse-rake whose head is disposed at right angles to the line of draft.

I claim in the horse-rake as follows, viz:

The axle arranged obliquely to the shafts or line of draft, and provided with wheel-journals arranged to stand at right angles with such line, in combination with the rake-head arranged obliquely to the said line, and having the teeth so applied to it as when in use to swing in planes parallel, or about so, with such line.

TRISTRAM LIBBEY.

Witnesses:
R. H. EDDY,
S. N. PIPER.